April 9, 1935.   H. O. PETTIT   1,997,342
ROAD GUIDE
Filed Jan. 3, 1934   3 Sheets-Sheet 1

Inventor
H. O. Pettit
By Clarence A. O'Brien
Attorney

April 9, 1935. H. O. PETTIT 1,997,342
ROAD GUIDE
Filed Jan. 3, 1934    3 Sheets-Sheet 2

Inventor
H. O. Pettit
By Clarence A. O'Brien
Attorney

April 9, 1935.  H. O. PETTIT  1,997,342
ROAD GUIDE
Filed Jan. 3, 1934   3 Sheets-Sheet 3

Inventor
H. O. Pettit
By Clarence A. O'Brien
Attorney

Patented Apr. 9, 1935

1,997,342

UNITED STATES PATENT OFFICE 1,997,342

ROAD GUIDE

Harold O. Pettit, Palmerton, Pa.

Application January 3, 1934, Serial No. 705,112

1 Claim. (Cl. 40—52)

This invention relates to a class of devices for an automobile to guide the operator along a strange road, and the principal object of the invention is to provide a guide of this character which will give to an operator of the vehicle travelling over a given road the "right" and "left" turns sufficiently in advance of the time they are to be made; and also to give to the driver of an automobile trailing the first a signal as to the direction the leading automobile is about to take.

A further object of the invention is to provide a device of this character which will not only serve as a road guide but also as a vehicle direction signal.

The invention together with its objects and advantages will be best understood from a study of the following description taken in connection with the accompanying drawings wherein.

Figure 2:
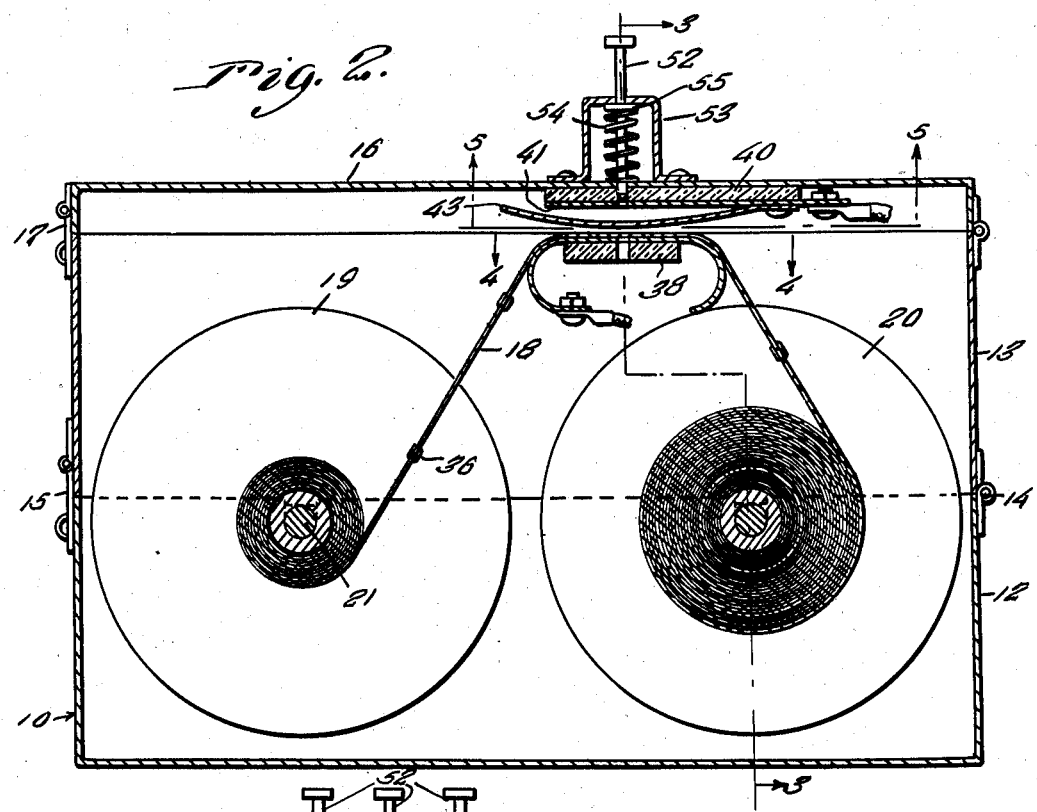
Figure 2 is a sectional view through the device.
Figures 3, 4:
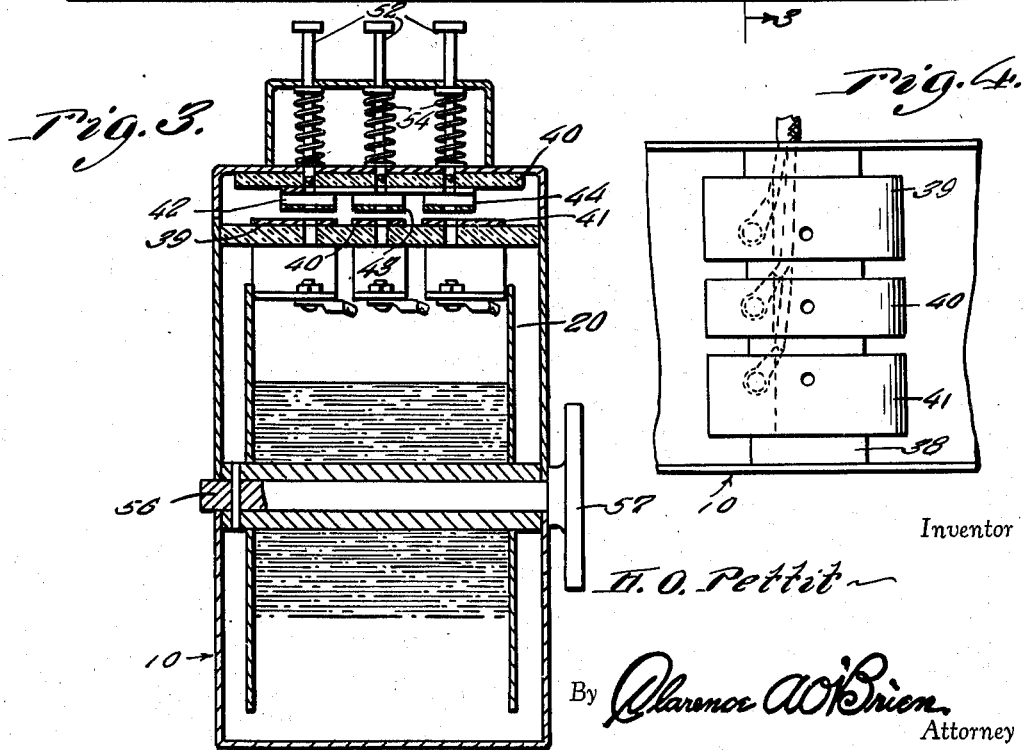
Figure 5:
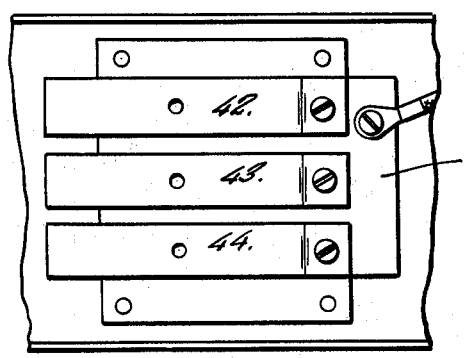

Figures 3, 4 and 5 are detail views taken substantially on the lines 3—3, 4—4 and 5—5 respectively of Figure 2.

Figure 1:
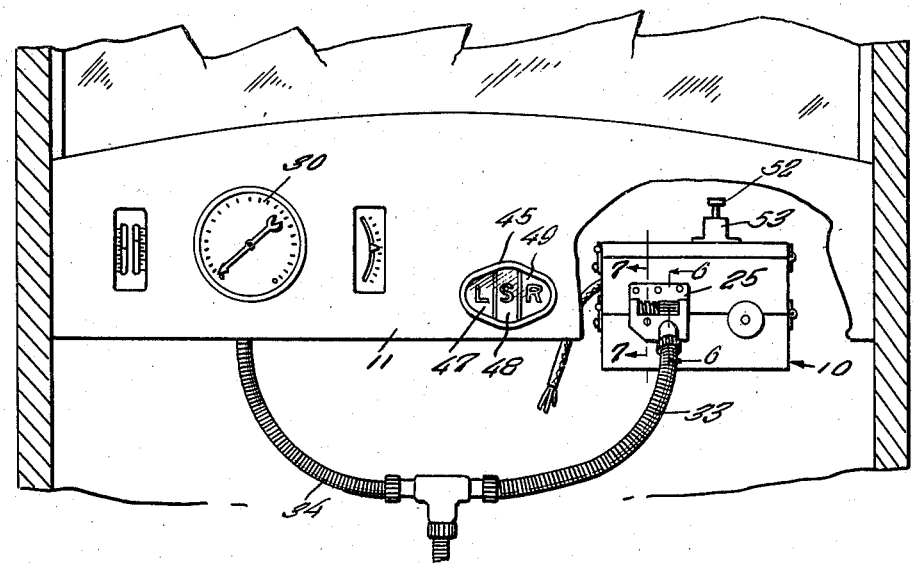
Figure 1 is a view showing the instrument mounted within an automobile.
Figures 6, 7:
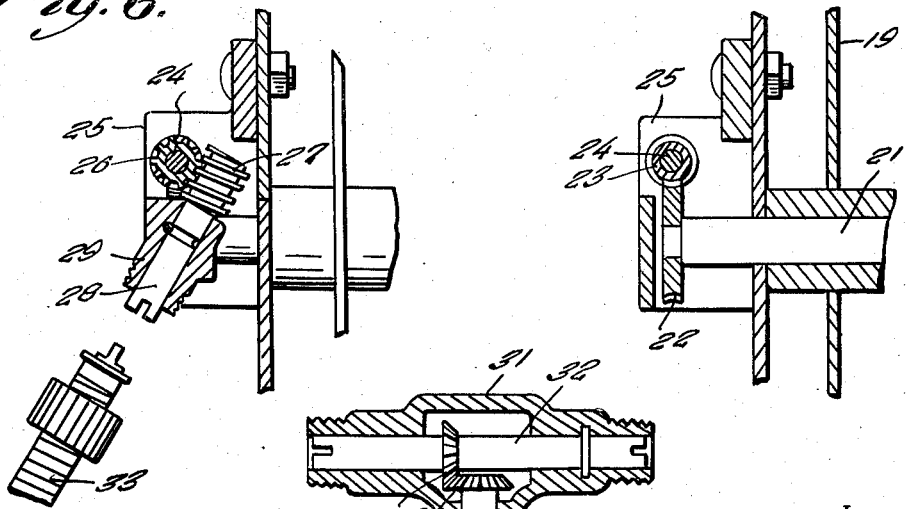

Figures 6 and 7 are detail sectional views taken substantially on the line 6—6 and 7—7 respectively of Figure 1.

Figure 8:

Figure 8 is a detail view through the coupling for the flexible shaft associated with the propeller shaft of a vehicle, the speedometer and a shaft forming part of the device of the invention.

Figure 9:
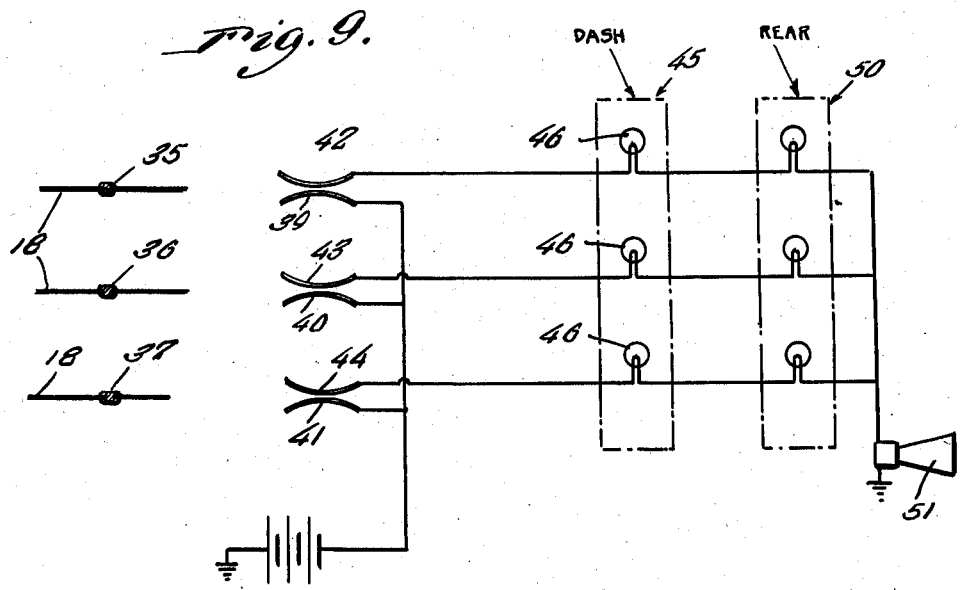

Figure 9 is a wiring diagram, and

Figure 10:
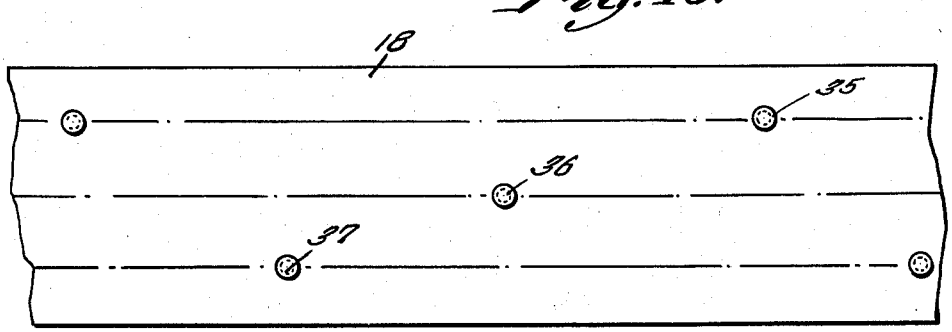

Figure 10 is a plan view of a portion of the tape.

Referring to the drawings by the reference numerals it will be seen that the device comprises a casing 10 which is adapted to be suitably mounted in rear of the instrument board 11 of the vehicle as suggested in Figure 1. In the preferred form thereof the casing 10 is divided horizontally into a bottom section 12 and a top section 13 hinged at one end as at 14 and provided at a relatively opposite end with suitable latch means 15. A hinge cover 16 is provided for the casing and latch means 17 is provided for securing the covering in closed position.

Provided within the casing 10 for properly supporting an indicia bearing tape 18 are reels or spools 19 and 20; the latter being a pay out spool and the former being a take up spool. The spools are substantially identical in construction.

Shaft 21 on which the spool 19 is secured to rotate therewith has one end projecting beyond one side of the casing 10 and equipped with a gear 22 in mesh with a worm 23 fixed to a shaft 24 journalled in a suitable bracket structure 25 mounted on said one side of the casing 10. The shaft 24 is provided with a second gear 26 that meshes with a worm 27 provided on the short shaft 28 journalled in an inclined bearing 29 formed integral with the bracket 25.

For operating the device of the invention incidental to the operation of the speedometer 30 there is provided a substantially T-shaped housing 31 in which are journalled shafts 32', 32, the latter having its oposite ends respectively connected in a conventional manner with flexible shafts 33, 34; shaft 33 being connected with the aforementioned shaft 28 and shaft 34 being connected with the proper shaft of the speedometer 30 as will be clear from a study of Figure 1. Shaft 32' is driven from the propeller shaft of the vehicle and is geared to shaft 32 as at 32a.

The tape 18 may have chartered, mapped or otherwise provided thereon indicia as to the particular route or road so as to be useful to an operator of an automobile in indicating such information as will aid the operator during the course of travel over a given road.

In Figure 10 there is shown a portion of the tape 18 and as shown, the tape will be provided at certain points thereon contactor buttons 35, 36 and 37 respectively to be used, as will be hereinafter more manifest, for indicating a "left" turn, or a "right" turn, or a "straightaway" stretch of road.

Mounted in the section 13 of the casing 10 and extending transversely of said section is a block 38 of insulating material and secured to this block and extending transversely thereof in laterally spaced relation are contact plates 39, 40 and 41, and as clearly shown in Figure 2 each of said plates has its opposite ends curved downwardly so as not to interfere with the proper movement of the tape 18 over said contacts 39, 40 and 41.

Secured to the under side of the cover 16 and so positioned as to overlie the plates 38 there is a plate 40' of insulating material to which is secured a plate 41' of conductive material. Anchored to the plate 41' adjacent one end thereof are spring contact fingers 42, 43 and 44 and these longitudinally bowed contact fingers are slightly spaced above the tape 18 as shown in Figure 2.

Visual as well as audible signal means is provided for notifying the operator in advance of a right or left turn in the road or a straightaway stretch, and such visual signal means includes a suitable lamp casing 45 mounted on the instrument board 11 as shown in Figure 1 and arranged within the lamp casing 45 are electric lamps 46. One lamp 46 is arranged adjacent a suitably colored glass, preferably a red glass 47 bearing suitable indicia to indicate "left" turn, while a second one of the lamps is located adjacent to a preferably yellow colored glass 48 bearing suitable indicia to indicate "a straight stretch of road ahead" while the third lamp is located adjacent to a glass 49 which may be colored green and provided with suitable indicia for indicating "right" turn. A similar signal element indicated generally by the reference numeral 50 will be located at the rear of the automobile for giving the signals above suggested to the operator of an automobile in the rear or following the automobile equipped with this invention.

An audible signal device, the same in the present instance being in the nature of a horn 51 is arranged in the circuit as suggested in Figure 9 so that when a lamp in each of the signal devices 45 and 50 is lit for giving a visual signal the horn 51 will be sounded for giving an audible signal.

As thought apparent the contact button 35 on the tape 18 will serve to bridge contact elements 39 and 42 while the contact button 36 will serve to bridge the contact element 40 and 43, and the contact button 37 to bridge the contact elements 41 and 44 for lighting the proper lamp of the signal elements 45 and 50 and for sounding the horn 51 to the end that the attention of the operator of the vehicle will be attracted by the device and thereby posted in advance of certain conditions along the road or route being travelled. Thus, for example, when the button 35 moves into contact with the contact elements 39 and 42 the circuit will be completed to that lamp 46 of the signal 45 adjacent to the glass 47 and also corresponding lamp as well as through the horn 51 with the result that by the sounding of the horn 51 the operator's attention is called to the device, and through the medium of the signal 45 he will be posted to the fact that he is approaching a left turn in the road. At the same time the operator of a vehicle in the rear will be notified in advance that the leading vehicle will within reasonable time or at a short distance ahead change his direction of travel to the left. In this way the operator of the following vehicle will also be more or less warned of the condition of the road ahead.

As is obvious the engagement of a contact button 36 with the contact 40, 43 will close the circuit through the lamp of the signals 45, 50 which will indicate "straight stretch ahead" and also complete the circuit to the horn 51 to attract the attention of the operator to the signal 45. Likewise engagement of a contact button 37 with the contact 41 and 44 will serve to close those lamps of the signals 45 and 50 which will indicate a right turn and also close the circuit to the horns of the vehicle to attract the attention of the operator to the signal 45 upon completion of the circuit to the last mentioned lamps.

To prepare the strip 18 for the contact buttons 35, 36 and 37, so that the buttons may be placed thereon at the correct proportional intervals there are provided means for punching holes in the strip at the proper intervals as the strip, minus of course the buttons 35, 36, 37 is, during the course of travel of the vehicle over a particular road, fed from the reel 20 to the reel 19 there are provided means now to be described. Such means consists in the provision of three punch rods 52 laterally spaced from one another transversely of the casing 10 and vertically slidable through apertures provided in the top of a combined guide and box like casing member 53 that is suitably secured to the cover 16 of the box or casing 10. The punch rods 52 are normally urged upwardly through the medium of springs 54 housed within the structure 53 and impinging at their upper ends against collars 55 suitably provided on the rods 52. As shown in Figure 2 the insulating block 40, the conductor plate 41, each of the spring fingers 42, 43 and 44, each of the contact members 39, 40 and 41 and the block 38 of insulating material are suitably apertured to permit the downward passage therethrough and through the tape 18 of the proper punch rod 52 for perforating the tape 18 at the proper location thereon to accommodate as well as also to indicate the proper location of one of the contact buttons 35, 36 and 37.

For rewinding the tape 18 onto the pay out reel 20 the shaft 56 of said reel is provided on one end thereof with a suitable handle 57 for rotating the reel 20 in a clockwise direction to wind the tape 18 thereon.

Having thus described my invention, what I claim as new is:

A route indicator for vehicles comprising a casing, a pair of shafts rotatably supported in the casing, means for rotating one shaft from a movable part of the vehicle, a spool on each shaft, a tape having its ends connected with the spools, an insulated bar supported in the casing and over which the tape passes as it travels from one spool to the other, contact strips supported by the bar in spaced relation and having their ends curving downwardly, the tape passing over the contact strips, a bar of insulating material connected with the top of the casing above the first bar, metal fingers connected with the lower face of the second mentioned bar and extending over the contact strips and spaced from the tape, metal projections on the tape for bridging the contact strips and the fingers, signal means carried by the vehicle, and circuits for the same which include the contact strips and the fingers.

HAROLD O. PETTIT.